United States Patent [19]

Connelly

[11] 3,749,061
[45] July 31, 1973

[54] VENTILATED STACKABLE ANIMAL CAGES

[76] Inventor: Richard L. Connelly, 9142 N. Mercer Way, Apt. 89, Mercer Island, Wash. 98040

[22] Filed: Jan. 28, 1972

[21] Appl. No.: 221,562

[52] U.S. Cl. .................................. 119/19, 119/17
[51] Int. Cl. ............................................. A01k 01/02
[58] Field of Search .................. 119/17, 18, 15, 22, 119/19

[56] References Cited
UNITED STATES PATENTS
| | | | |
|---|---|---|---|
| 3,220,383 | 11/1965 | Bruner | 119/17 |
| 2,335,173 | 11/1943 | Corey | 119/21 |
| 3,087,458 | 4/1963 | Bennett, Jr. | 119/17 |

*Primary Examiner* — Hugh R. Chamblee
*Attorney* — Richard W. Seed, Benjamin F. Berry and Robert A. Jensen et al.

[57] ABSTRACT

An animal cage made of a fiber impregnated plastic or other suitable material having impermeable side, bottom and end walls and a permeable hinged door closing the front end thereof. The top portion of the cage is similarly integrally formed but has at least one upstanding hollow integrally formed rib therein which serves to support a cage stacked vertically above and includes openings in the side portions of the rib permitting a ventilating air flow therethrough. A plurality of cages may be used in a back wherein they are stacked in vertical rows with their front portions substantially planar. Sealing elements may then be placed round the front of the cages forming a solid wall and and the area behind the wall may be closed forming a plenum, which with the addition of an exhaust fan draws any objectionable odor through the rear of the cages and out of the building, while simultaneously preventing stagnant air buildup.

8 Claims, 2 Drawing Figures

PATENTED JUL 31 1973  3,749,061

VENTILATED STACKABLE ANIMAL CAGES

BACKGROUND OF THE INVENTION

In dog pounds, kennels and veterinary clinics, because of the necessity of economizing upon space, cages to hold animals traditionally have been stacked. The stacking of cages presents a plurality of problems. One of the problems is the disposal of waste products, a problem which was substantially solved by the cage which is the subject matter of U. S. Pat. No. 3,087,458 granted to Bennett on Apr. 30, 1963. Another problem which has continually plagued these types of installations is the necessity for a secondary framework to support the cages in their vertically stacked position. The solution to this problem normally has included the necessity of a separate frame structure fabricated of many elements to which the individual cages are mounted.

Yet another problem with a stacked cage unit is that with the plurality of animals within a small confined area the odor often becomes objectionable to visitors, clients and to the workers themselves.

Prior art cages have solved some of the problems but none have solved all. As noted above, the waste problem is attacked in the patent to Bennett who incorporates a molded plastic cage element but his cage requires a separate supporting framework and provides for ventilation only through the air permeable door structure. Other installations have had the ability to be adequately ventilated by including one or more of the enclosing sections, in addition to the door, made of an air permeable material but required a separate framework and presented cleanliness problems since the permeable surface acts to collect dust and other foreign objects.

It would thus be desirable to have an animal cage which is self stacking to economize on floor space, one which does not need an external frame structure to enable the cages to be stacked one upon another. Further, it would be desirable to have a cage which was fabricated of a material having a smooth inner surface such that the cage may be easily cleaned and one which is continuously vented rearwardly of the cage and exhausted to the outside to remove all of the objectionable odors from the cage holding facility.

In view of the above problems and objects it is a particular object of the present invention to provide an animal cage which includes as an integral portion thereof a means whereby the cage is stackable without the necessity for external framework.

Another object of the present invention is to provide an animal cage which is fabricated of a molded fiber impregnated plastic or other suitable material whereby the interior surface of the cage is substantially smooth and easy to clean and yet allows ventilation therethrough.

Yet another object of the present invention is to provide an animal cage which is substantially closed with the exception of the front portion which is permeable both for reasons of air circulation and for visual inspection and includes an open portion in the upper rear section of the cage allowing circulation of air through the cage without subjecting the animal within the cage to undue draft conditions; not providing a collection place for foreign particles and yet providing a vent for objectionable odors.

It is yet another object of the present invention to provide a cage system wherein a plurality of cages are stacked within an enclosed plenum area which has a positive exhaust venting system. The air is thus circulated inwardly through the front of each of the cages and outwardly through the rear portion thereof to be forced out to the atmosphere removing the objectionable odor from the immediate area surrounding the front portion of the cases as well as equalizing the temperature throughout the installation.

Still a further object of the present invention is to provide animal cages which are stackable and molded of a fiber impregnated resin including as a portion thereof an upstanding hollow rib which serves not only to support a cage stacked above but further has openings in the side of the rib extending to the interior of the cage whereby the cage is vented through the upstanding rib portion.

DETAILED DESCRIPTION OF THE DRAWINGS

Figure 1:
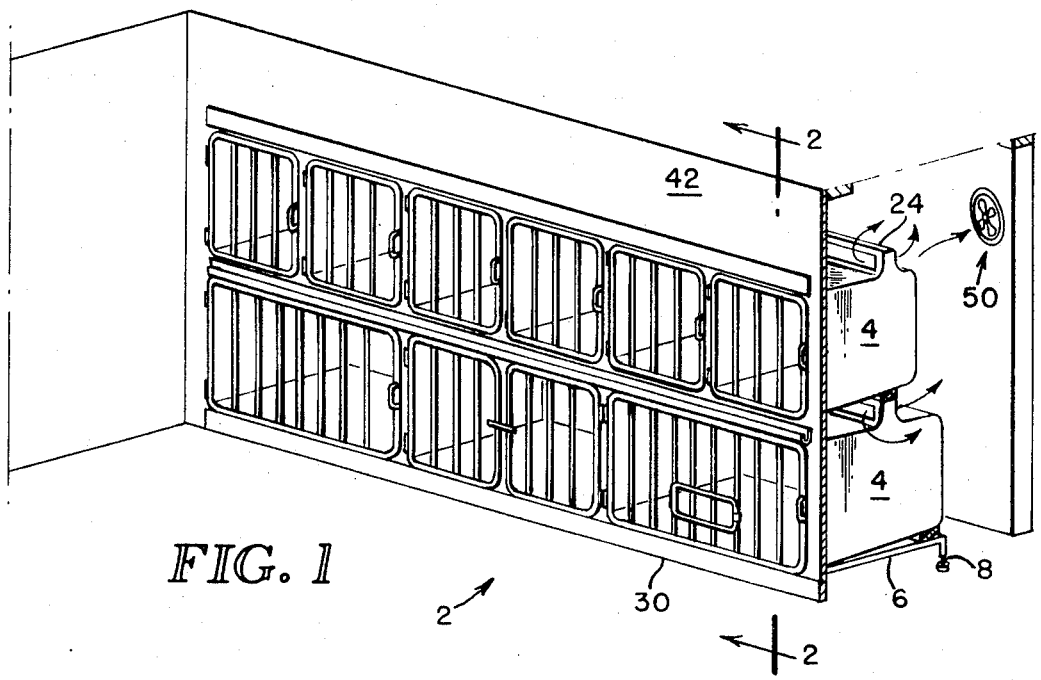
FIG. 1 is a perspective view of an animal cage system in accordance with the present invention.

As seen in the drawings, the system of cages, which are the subject matter of the present invention, are generally designated as 2 and comprise a plurality of individual cage units 4. The cages which may differ in size and closure gates shown as hinged, barred doors 5, are stacked vertically two or three high depending upon the size of the cages and the vertical dimensions of the room and horizontally from wall to wall for reasons to be explained hereinafter. The lowermost cage rests upon a rigid platform 6 having downwardly depending legs including threaded leveling devices 8 to assure a vertical stack even though the floor may not be level. The front portion of the cage has an outwardly flared lip 10 around its entire periphery, the lower part of which rests in a position overhanging the edge of the platform 6 providing positive alinement therewith. The rear of the cage rests upon a compressible shock absorbing and sound deadening element 12 thus making the cage more comfortable for the tenant and giving it the proper orientation.

Figure 2:
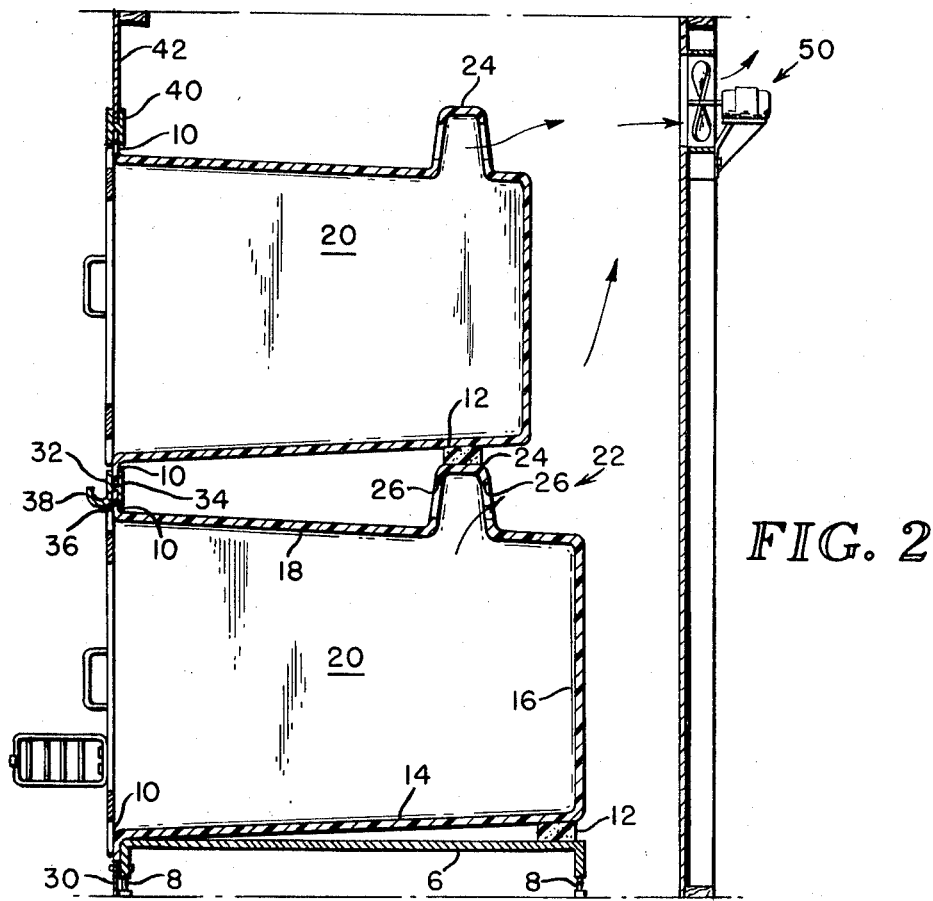
FIG. 2 is a vertical sectional view on an enlarged scale taken along lines 2—2 of FIG. 1 illustrating the details of construction of the stackable venting features.

As can be seen in FIG. 2, the cage itself comprises a unitary molded generally rectangular shaped shell fabricated of a fiber impregnated resin plastic such as fiberglas or alternatively unreinforced plastic, formed steel or the like. The use of material such as those mentioned provides a smooth interior surface greatly assisting in the cleaning operation as well as having sufficient structural integrity, providing the necessary rigidity for stacking other units thereon. All of the walls including bottom wall 12, end wall 16, top wall 18 and side walls 20 are impermeable with the exception of an upwardly extending rib 22 upon the top wall.

The rib 22 which is generally parallel to the front surface has a generally flat upper surface 24 and openings 26 on the sides thereof which extend to the interior of the cage allowing gaseous circulation from the interior of the cage outwardly.

Thus, as is apparent, the cage is substantially a one-piece unit with the exception of the front which may be optionally closed with screened, barred or other hinged doors to allow visual inspection of the interior of the cage as well as providing means for the entry of the necessary air. As is well known, the doors may be hinged from one side, split in the middle and hinged from both sides and further may include a small door within the larger one permitting feeding or the like without providing a means whereby the enclosed animal may escape.

When the cages are placed in a system such as shown in FIG. 1 the bottom portion of the front of the cages will be closed by a molding 30 which seals the area betweeen the bottom most portion of the flange 10 and the supporting structure. The gates or fronts of the cages as noted above may assume any one of a variety of configurations but in general they will close against the outwardly projecting flange 10 and be mounted upon hinges. As seen in FIG. 2, the second cage will stack upon the first cage with the downwardly depending flange 10 resting in the upper grooved portion 34 of a framing element 32 which includes a downwardly facing groove 36 to receive the upwardly extending flange 10 of the lower unit and may include as an integral portion thereof a trough 38 to catch any spills.

A similar ventilation system including an upstanding rib 22 having slots 26 is used with respect to the upper cage as was hereinabove described with respect to the lower and it will be noted that the compressible sound absorbing member 12 rests upon the upper flat portion 24 of the rib 22 thus providing support for the rear of the upper cage.

In the event that the system of cages includes a stack of three vertical cages the third cage would interact with the second cage in a fashion similar to the manner in which the second cage interacts with the first.

For purposes of illustration a vertical stack of only two cages is shown and it can be seen that the outwardly projecting flange portion 10 at the top of the second cage unit cooperates with an H-shaped frame member 40 which has a lower groove to accept the flange 10 and an upper groove to accept a wall 42 which encloses the upper portion of the cage system.

Although not shown in detail, the sides of the adjacent flanges 10 on adjacent vertical columns of the cages will be interconnected by joining elements similar to the top frame member 40 thus holding each of the cages in a fixed vertical stack as well as interlocking adjacent stacks.

Thus it can be seen that when the cage system is used, a multiplicity of stacked cages wil be enclosed by a front wall formed by the cage doors, the upper closing wall 42 and the lower molding 30. Sidewalls and backwalls will be provided such that the main body portion of the cages 4 will rest within an enclosed area which will serve as a plenum. To provide ventilation and offer airflow through the cages a fan 50 will be mounted upon an outer wall such that it continuously draws air in through the screened front doors of the cages out through the opening 26 in the upper portion of the cages. The air is vented to the outside atmosphere thus continuously removing any offensive odors from the area in the front of the cages.

Thus it can be seen that the use of the present inventive cage results in a great deal of economy in the fact that a separate frame structure is not necessary. The only element necessary besides the cages is the independent frame member which serves to interlock two adjacent cages to prevent relative movement therebetween but which does not provide structural support.

The structural support for the entire cage is provided by the rigidity of the cage itself and its upwardly projecting rib element 22 acting in conjunction with the base portion of the next vertical cage element and by the relative positioning of the flanges 10. In addition to providing a self-stacking feature wherein the number of auxiliary parts is kept to a minimum, the present cage likewise provides a smooth interior surface for sanitary reasons as well as for a continual ventilation system wherein all of the offensive odors may be drawn rearwardly to an enclosed plenum area which is then exhausted to the outside removing all of the normally offensive odors. The number of cage units within a given system will be determinative of the size of exhaust fan which should provide a continuous air movement without causing a draft. The continual air circulation further serves to maintain a uniform temperature throughout the installation, preventing the buildup of hot stagnant air.

The embodiments of the invention in which an exclusive property or privilege is claimed are defined as follows:

1. A stackable animal cage comprising a generally rectangular hollow one piece main body portion having continuous, impermeable side, bottom, end and top walls and an open front portion adapted to be closed by a hinged gate portion allowing air circulation and visual inspection therethrough, said top wall including an integral upstanding rib generally parallel to the end wall and spaced therefrom, said rib having a solid top portion and an open bottom portion exposed to the interior of the cage and having openings in the side portions allowing stale air within the cage to circulate outwardly through the openings in the rib, said rib further serving as the support for a second cage stacked upon the first cage.

2. An animal cage as in claim 1 wherein a resilient member is secured to the outside rear of the bottom portion providing a sound absorbing and shock absorbing rear leg placing the cage in proper orientation.

3. An animal cage as in claim 1 and further including an outwardly extending peripheral flange at the front of the cage, said flange serving as a mounting support for the door, a support for the front of the cage and as a part of the interlocking means for adjacent cages whether vertical or horizontal.

4. A system as in claim 2 wherein each of the cages is made of molded fiber impregnated plastic having smooth continuous side, end and bottom walls.

5. A kennel system comprising;
a plurality of cages with air permeable doors stacked with their front ends substantially coplanar,
means sealing the portion surrounding the front ends whereby the only opening in the front of the system is the door of each cage,
means enclosing the sides, top, bottom and back of the area where the cages are stacked thus forming a substantially closed plenum area,
means integral with each of the cages at the upper portion thereof, allowing air to flow therethrough, whereby natural air currents will move air through an occupied cage, said means so located to prevent insertion of an occupant's appendage, and
means continuously evacuating air from the area where the cages are stacked whereby air is continuously circulated inwardly through the front of the cage and then outwardly through the upper portions of the cage and then out from the plenum area where the main body portion of the cages are stacked thus eliminating unpleasant odors from the area in the front of the cages.

6. A system as in claim 5 wherein each of the cages includes at least one integral rib in its top surface adapted to support the cage stacked above it whereby no external framework is necessary.

7. A system as in claim 6 wherein the rib is hollow, open to the interior of the cage and includes openings in its side wall to allow air to flow therethrough.

8. A system as in claim 6 requiring no external framework, a peripheral flange at the front of the cage and the upstanding rib providing support respectively for the front and rear of the individual cage and the flange further providing means for interlocking adjacent cages.

* * * * *